UNITED STATES PATENT OFFICE.

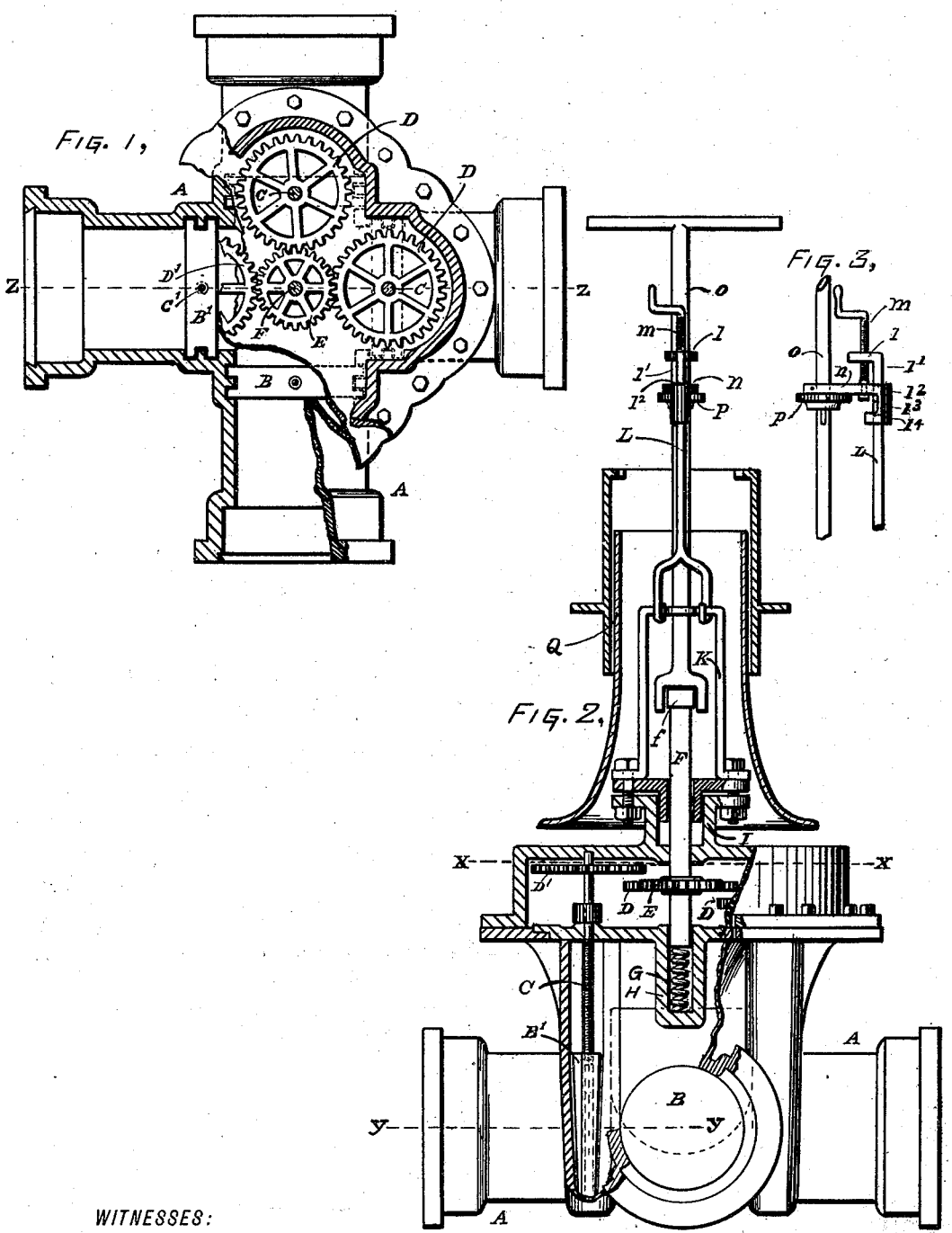

AUGUST KLAWON, OF JACKSON, MICHIGAN.

GAS OR WATER VALVE.

SPECIFICATION forming part of Letters Patent No. 646,999, dated April 10, 1900.

Application filed September 11, 1899. Serial No. 730,192. (No model.)

*To all whom it may concern:*

Be it known that I, AUGUST KLAWON, a citizen of the United States, residing at Jackson, in the county of Jackson and State of Michigan, have invented a new and useful Four-Way Valve, of which the following is a specification.

My invention relates to improvements in gas and water valves, particularly those of large size, for mains; and the object of my invention is to be able to conveniently and economically shut off or open the flow of gas or of water in either or all directions from and to street-crossing mains. I accomplish this object by the mechanism illustrated in the accompanying drawings, in which—

Figure 1 is a plan view of my device dually broken away to show partial horizontal sections through $x\ x$ and $y\ y$ of Fig. 2. Fig. 2 is an elevation of my device, partly broken away to show a vertical section through $z\ z$ of Fig. 1. Fig. 3 is a side elevation of the valve-connecting mechanism.

Similar letters refer to similar parts throughout the several views.

A A is a gas or water pipe cross which I provide with the valves B, each operated by a screw C in a manner similar to the operation of the ordinary straightway valve. Each of the screws C is provided with a gear-wheel D, by which the screws C C are rotated. These gear-wheels D are all located in parallel planes sufficiently separated, so that a driving gear-wheel E operates either one of the wheels D without disturbing the others. This driving-wheel E is rigidly secured to the valve-stem F, which is provided with a square head $f$ for a wrench-seat. The wheel E and its shaft F are concentric in their axes with the axes of the wheels D, so that the wheel E will mesh with either of the wheels D. A spring G, inclosed in the box H, Fig. 2, holds the shaft F in constant tendency upward. A yoke K is secured by the bolts of the stuffing-box I, upon which I hook the key-clamping and valve-connecting device, (see Figs. 2 and 3,) which is composed of a clamp-bar L, the end of which is bent, as shown at $l$, and provided with the screw M, and on the clamp-bar L a clamp-jaw N is sleeved to travel easily. O is an ordinary gas or water key or end wrench, upon the stem of which a collar P is rigidly secured. Q is a stop-box for access in operating.

The operation of my device is as follows: Open the stop-box, set the key onto the head $f$ of the valve-stem F, hook the clamp-bar I over the yoke K, unscrew the screw M until the top of the clamp-jaw N is at the graduation-mark $l'$ or at the top, swing the clamp-bar L up perpendicular. Then the clamp-jaw N will lie over on the collar P and the wheel E be in mesh with the wheel D', shown at the left. Now turn the key until the valve D' is open or closed, as the case may be. For each of the other wheels D, with their valves B, screw M down until $l^2$, $l^3$, or $l^4$ is indicated, as desired, and repeat the operation. When done, take off the clamp and key and close the box.

I do not confine myself particularly to a cross or four-way valve, as it may be desirable to similarly operate two or more valves.

What I claim, and desire to secure by Letters Patent, is—

1. Two or more gas or water valves operated by a gear-wheel attached to a valve-stem equidistant from gear-wheels on the operating-screws of the valves arranged to be operated separately and independently substantially as shown and described.

2. Two or more gas or water valves operated by a gear-wheel attached to a valve-stem equidistant from the operating-screws of the valves by means of gear-wheels meshing with the valve-stem wheel, the screw-wheels in different planes to be operated separately by passing the valve-stem wheel from the plane of one valve-wheel to that of another substantially as described and set forth.

3. In a poly-valve the separated valves operated independently, in combination with the key-clamp and key for adjusting the location of the valve-stem wheel, substantially as shown and described.

AUGUST KLAWON.

Witnesses:
E. M. FROST,
ALEX CREEK.